US012641016B2

(12) United States Patent
Song et al.

(10) Patent No.: US 12,641,016 B2
(45) Date of Patent: *May 26, 2026

(54) ADDING NETWORK SERVICES TO MPLS NETWORK

(71) Applicant: Huawei Technologies Co., Ltd., Shenzhen (CN)

(72) Inventors: Haoyu Song, San Jose, CA (US); Zhenbin Li, Beijing (CN); Tianran Zhou, Beijing (CN); James N. Guichard, Hollis, NH (US); Stewart Frederick Bryant, Redhill (GB); Andrew G. Malis, Andover, MA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 533 days.

This patent is subject to a terminal disclaimer.

(21) Appl. No.: 18/165,106

(22) Filed: Feb. 6, 2023

(65) Prior Publication Data
US 2023/0188462 A1     Jun. 15, 2023

Related U.S. Application Data

(63) Continuation of application No. 17/147,208, filed on Jan. 12, 2021, now Pat. No. 11,582,148, which is a
(Continued)

(51) Int. Cl.
| | |
|---|---|
| *H04L 45/50* | (2022.01) |
| *H04L 45/16* | (2022.01) |
| *H04L 69/22* | (2022.01) |

(52) U.S. Cl.
CPC ............ *H04L 45/507* (2013.01); *H04L 45/16* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,374,303 | B1 | 4/2002 | Armitage et al. |
| 8,144,710 | B2 | 3/2012 | McGuire et al. |
| | | (Continued) | |

FOREIGN PATENT DOCUMENTS

| | | | |
|---|---|---|---|
| CN | 1780259 | A | 5/2006 |
| CN | 1878165 | A | 12/2006 |
| | | (Continued) | |

OTHER PUBLICATIONS

RFC 7274: "Allocating and Retiring Special-Purpose MPLS Labels" by K. Kompella, L. Andersson, A. Farrel; pp. 1-11 (Year: 2014).*
(Continued)

*Primary Examiner* — Xavier S Wong

(57) ABSTRACT

Described herein are methods and devices (e.g., routers) that add network services to a multiprotocol label switching (MPLS) network. A method can include a network device of the MPLS network receiving a packet, the network device of the MPLS network modifying the packet by adding multiple MPLS extension headers, wherein each of the multiple MPLS extension headers added to the packet is used to support a different one of multiple network services for the MPLS network, and the network device of the MPLS network forwarding the packet as modified to another network device of the MPLS network.

26 Claims, 5 Drawing Sheets

Related U.S. Application Data continuation of application No. PCT/CN2019/095180, filed on Jul. 9, 2019.

(60) Provisional application No. 62/697,783, filed on Jul. 13, 2018.

(56) References Cited

U.S. PATENT DOCUMENTS

| | | | |
|---|---|---|---|
| 9,049,145 B2 | 6/2015 | Li et al. | |
| 9,350,605 B2 | 5/2016 | Bhattacharya et al. | |
| 9,749,227 B2 | 8/2017 | Yost et al. | |
| 10,348,648 B2 | 7/2019 | Pignataro et al. | |
| 10,601,961 B2 | 3/2020 | Patel et al. | |
| 10,616,063 B1 | 4/2020 | Dutta | |
| 10,931,580 B2 | 2/2021 | Zheng et al. | |
| 11,582,148 B2 * | 2/2023 | Song | H04L 69/22 |
| 2002/0152321 A1 | 10/2002 | Le et al. | |
| 2002/0176450 A1 | 11/2002 | Kong et al. | |
| 2002/0186692 A1 | 12/2002 | Chang et al. | |
| 2003/0097481 A1 | 5/2003 | Richter | |
| 2004/0223502 A1 * | 11/2004 | Wybenga | H04L 49/3009 |
| | | | 370/466 |
| 2005/0232277 A1 | 10/2005 | See | |
| 2008/0025308 A1 | 1/2008 | Morgan et al. | |
| 2008/0159288 A1 * | 7/2008 | Nagarajan | H04L 45/28 |
| | | | 370/392 |
| 2010/0226315 A1 | 9/2010 | Das et al. | |
| 2012/0069845 A1 | 3/2012 | Carney et al. | |
| 2012/0069847 A1 | 3/2012 | Saad et al. | |
| 2012/0219003 A1 | 8/2012 | Cui et al. | |
| 2013/0336315 A1 | 12/2013 | Guichard et al. | |
| 2014/0226662 A1 | 8/2014 | Frost et al. | |
| 2014/0369356 A1 * | 12/2014 | Bryant | H04L 45/745 |
| | | | 370/392 |
| 2015/0103691 A1 | 4/2015 | Bhattacharya et al. | |
| 2015/0109902 A1 | 4/2015 | Kumar et al. | |
| 2015/0256456 A1 | 9/2015 | Previdi et al. | |
| 2016/0044532 A1 | 2/2016 | Champel | |
| 2016/0099864 A1 | 4/2016 | Akiya et al. | |
| 2016/0294987 A1 * | 10/2016 | Tian | H04L 41/04 |
| 2016/0315921 A1 | 10/2016 | Dara et al. | |
| 2017/0250907 A1 | 8/2017 | Pignataro et al. | |
| 2017/0289032 A1 | 10/2017 | Guichard et al. | |
| 2017/0302571 A1 | 10/2017 | Frost et al. | |
| 2017/0310594 A1 | 10/2017 | Kotha et al. | |
| 2017/0324654 A1 | 11/2017 | Previdi et al. | |
| 2017/0373990 A1 | 12/2017 | Jeuk et al. | |
| 2018/0062984 A1 | 3/2018 | Hill et al. | |
| 2018/0375763 A1 | 12/2018 | Brissette et al. | |
| 2019/0036818 A1 | 1/2019 | Nainar et al. | |
| 2019/0149449 A1 | 5/2019 | Morris | |
| 2020/0244582 A1 * | 7/2020 | Li | H04L 45/02 |
| 2020/0296033 A1 | 9/2020 | Hill et al. | |
| 2020/0322353 A1 | 10/2020 | Bhandari et al. | |
| 2020/0358698 A1 | 11/2020 | Song et al. | |
| 2020/0382379 A1 | 12/2020 | Bashandy et al. | |
| 2020/0382415 A1 | 12/2020 | Chunduri et al. | |
| 2021/0021513 A1 | 1/2021 | Filsfils et al. | |
| 2021/0083977 A1 | 3/2021 | Ren et al. | |
| 2021/0135986 A1 | 5/2021 | Song et al. | |
| 2021/0203599 A1 | 7/2021 | Guichard et al. | |
| 2021/0306257 A1 * | 9/2021 | Dutta | H04L 45/20 |
| 2023/0155930 A1 * | 5/2023 | Dong | H04L 12/4645 |
| | | | 370/392 |
| 2025/0133014 A1 * | 4/2025 | Huang | H04L 69/22 |

FOREIGN PATENT DOCUMENTS

| | | | |
|---|---|---|---|
| CN | 101257455 A | 9/2008 | |
| CN | 101588367 A | 11/2009 | |
| CN | 101636973 A | 1/2010 | |
| CN | 102271079 A | 12/2011 | |
| CN | 102577260 A | 7/2012 | |
| CN | 102598601 A | 7/2012 | |
| CN | 103503387 A | 1/2014 | |
| CN | 104980350 A | 10/2015 | |
| CN | 106464542 A | 2/2017 | |
| CN | 106656781 A | 5/2017 | |
| WO | WO2012/055168 A1 | 5/2012 | |
| WO | WO2020/011143 A1 | 1/2020 | |

OTHER PUBLICATIONS

International Search Report & The Written Opinion of the International Searching Authority dated Oct. 9, 2019, International Application No. PCT/CN2019/095180.

English Abstract of CN Publication No. CN101588367 published Nov. 25, 2009.

Liu Hong, PTN Technology Helps Xiamen Radio and Television Group Customers Access, Telecommunications Technology, 2013, Issue 05, 4 pages.

J. Brzozowski et al, IPv6 Spring Use Cases draft-ietf-spring-ipv6-use-cases-07, Jul. 22, 2016, 13 pages.

Chinese Office Action dated Jun. 10, 2021, Chinese Application No. 201980045370.8.

Notice of Allowance dated Aug. 11, 2021, U.S. Appl. No. 16/940,323, filed Jul. 27, 2020.

Request for Comments: 4659, J. De Clercq et al, BGP-MPLS IP Virtual Private Network (VPN) Extension for IPv6 VPN, Sep. 2006, total 18 pages.

Request for Comments: 4901, J. Ash, Ed. et al, Protocol Extensions for Header Compression over MPLS, Jun. 2007, total 34 pages.

Xiao Zhongjie et al, Study of Label Stack Applications in MPLS, 2004, total 3 pages.

Notice of Allowance daled Dec. 3, 2021, Chinese Patent Application No. 201980045370.8.

Chinese Office Action dated Nov. 21, 2022, Chinese Patent Application No. 202110118938.8.

Non-final Office Action dated Apr. 26, 2022, U.S. Appl. No. 17/147,208, filed Jan. 12, 2021.

Response to Office Action dated Jul. 6, 2022, U.S. Appl. No. 17/147,208, filed Jan. 12, 2021.

Final Office Action dated Jul. 29, 2022, U.S. Appl. No. 17/147,208, filed Jan. 12, 2021.

Response to Office Action dated Sep. 28, 2022, U.S. Appl. No. 17/147,208, filed Jan. 12, 2021.

Notice of Allowance dated Oct. 13, 2022, U.S. Appl. No. 17/147,208, filed Jan. 12, 2021.

P. Quinn et al: "RFC 8300-Network Service Header (NSH)", XP055733920, Internet Engineering Task Force (IETF), Jan. 1, 2018, 40 pages.

Office Action dated Jun. 5, 2023, European Patent Application No. 19833705.7.

Quinn, P., Ed., Elzur, U., Ed., and C. Pignataro, Ed., "Network Service Header (NSH)", RFC 8300, DOI 10.17487/RFC8300 Jan. 2018 (Year: 2018).

H. Song, Ed. et al. Segment Routing with MPLS Extension Header draft-song-segment-routing-mpls-extension-header-00, Network Working Group Internet-Draft Intended status: Standards Track, May 10, 2018, total 8 pages.

* cited by examiner

100

MPLS Label Stack Entry Format

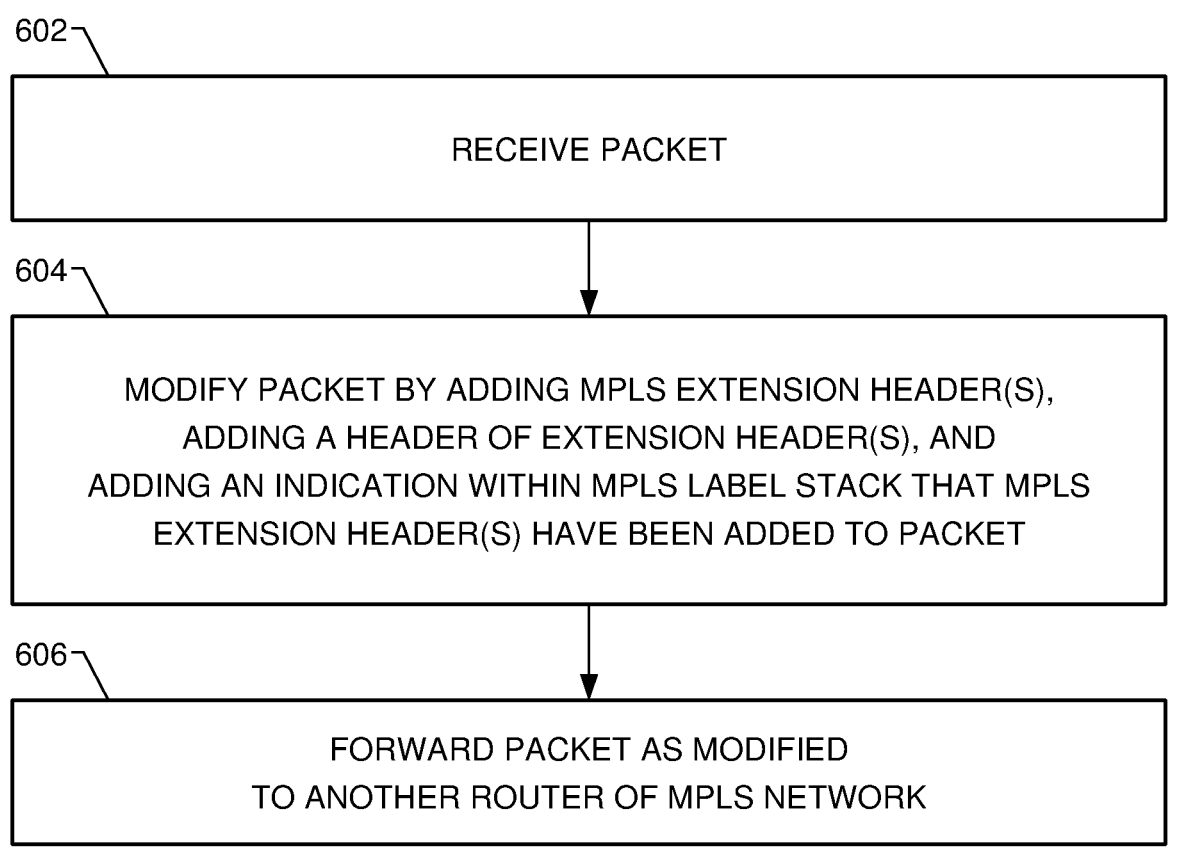

602 ⌐

RECEIVE PACKET

604 ⌐

MODIFY PACKET BY ADDING MPLS EXTENSION HEADER(S),
ADDING A HEADER OF EXTENSION HEADER(S), AND
ADDING AN INDICATION WITHIN MPLS LABEL STACK THAT MPLS
EXTENSION HEADER(S) HAVE BEEN ADDED TO PACKET

606 ⌐

FORWARD PACKET AS MODIFIED
TO ANOTHER ROUTER OF MPLS NETWORK

*FIG. 6*

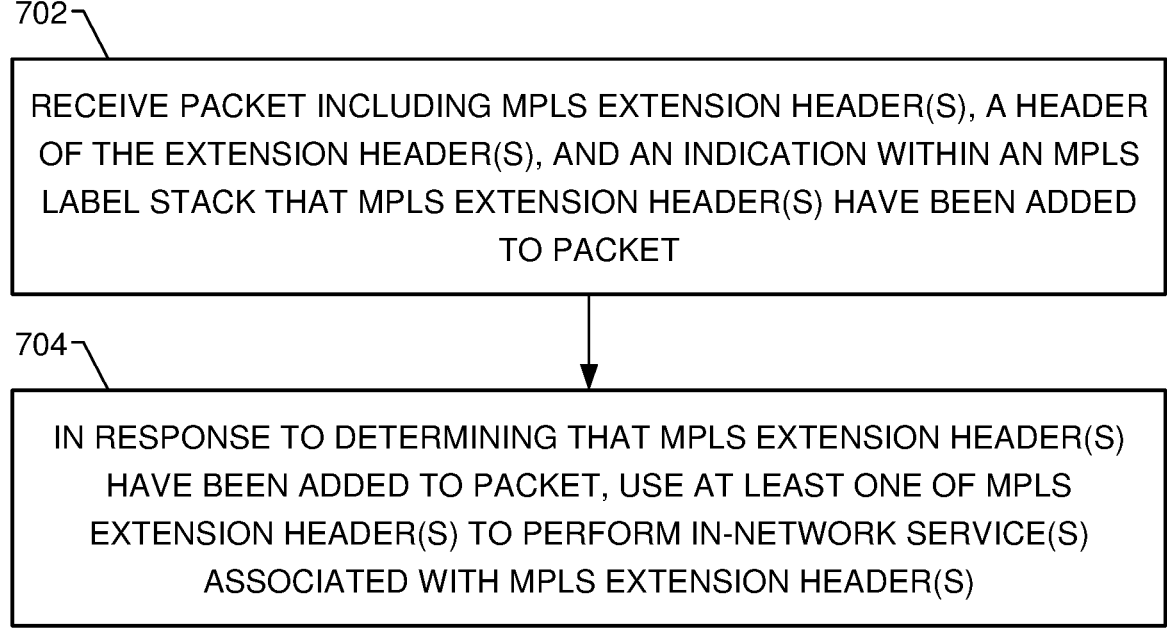

702 ⌐

RECEIVE PACKET INCLUDING MPLS EXTENSION HEADER(S), A HEADER
OF THE EXTENSION HEADER(S), AND AN INDICATION WITHIN AN MPLS
LABEL STACK THAT MPLS EXTENSION HEADER(S) HAVE BEEN ADDED
TO PACKET

704 ⌐

IN RESPONSE TO DETERMINING THAT MPLS EXTENSION HEADER(S)
HAVE BEEN ADDED TO PACKET, USE AT LEAST ONE OF MPLS
EXTENSION HEADER(S) TO PERFORM IN-NETWORK SERVICE(S)
ASSOCIATED WITH MPLS EXTENSION HEADER(S)

*FIG. 7*

ADDING NETWORK SERVICES TO MPLS NETWORK

PRIORITY CLAIM

This application is a continuation of U.S. patent application Ser. No. 17/147,208, filed, Jan. 12, 2021, by Song et al., which is a continuation of PCT Patent Application No. PCT/CN2019/095180 filed Jul. 9, 2019, by Song et al., which claims benefit to U.S. Provisional Patent Application No. 62/697,783 filed Jul. 13, 2018 by Song et al., each of which is titled "MPLS EXTENSION HEADERS FOR IN-NETWORK SERVICES." Each of the above applications is incorporated by reference herein in its entirety. Priority is claimed to each of the above applications.

TECHNICAL FIELD

The disclosure generally relates to communication networks, and more particularly, to communications networks that utilize multi-protocol label switching (MPLS).

RELATED APPLICATION

This application is related to commonly invented and commonly assigned U.S. patent application Ser. No. 16/940, 323, filed Jul. 27, 2020, titled "SEGMENT ROUTING IN MPLS NETWORK."

BACKGROUND

MPLS was originally conceived to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc.) by the use of Pseudowire (PW) encapsulation techniques. The architecture of the MPLS standard is set out in RFC 3031 entitled "Multiprotocol Label Switching Architecture" submitted by E. Rosen et al. in January 2001 to the Internet Engineering Task Force (IETF). Electronic copies of this document are available for download from the URL: www.ietf.org/rfc/rfc3031.txt. Updates to the MPLS standard are made available on the IETF's website https://datatrackerietf.org/doc/.

MPLS essentially enables faster routing decisions by preconfiguring "tags" which determine a path between one router and the next. The "tags" are essentially labels carried in short packet header fields which are extracted by switching/forwarding network nodes (known as label switched routers (LSRs)). LSRs are preconfigured to associate certain labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS label stacking is already known in the art as a means of implementing MPLS tunneling. To implement MPLS tunneling, an outer transport label is used to establish a bulk transport Label Switched Path (LSP) (which functions as a tunnel), often between the provider edge devices of a provider's network, and within each bulk LSP, inner transport labels are used to identify each traffic flow. Each packet can carry many label stack entries organized as a last-in-first-out stack. In normal forwarding across an MPLS network, a LSR processes only the top (i.e., outermost)

label. At any LSR, a labelled header can be added to the stack (by the LSR performing a "push" operation) or removed from the stack (by the LSR performing a "pop" operation). The label stacking allows the aggregation of LSPs into a single LSP for a portion of the route, which creates a "tunnel".

While MPLS has provided many benefits over prior networking protocols, as well as over some newer network protocols, it was not specifically designed to support in-network services. In-network services, as the term is used herein, refers to functions, applications, or services applied by network devices (e.g., routers) on user traffic.

SUMMARY

According to one aspect of the present disclosure, a method is provided for adding one or more in-network services to a multiprotocol label switching (MPLS) network. The method comprises a router of the MPLS network receiving a packet. The method further comprises the router of the MPLS network modifying the packet by adding one or more MPLS extension headers, adding a header of the extension header(s), and adding an indication within an MPLS label stack that one or more MPLS extension headers have been added to the packet. Additionally, the method comprises the router of the MPLS network forwarding the packet as modified to another router of the MPLS network.

Optionally, in any of the preceding aspects, at least one of the one or more MPLS extension headers added to the packet support an in-network service that is not supported by the MPLS network. For example, in-network services that the method can add to an MPLS network include, but are not limited to: a network service header (NSH) service, an in-situ operations, administration, and maintenance (IOAM) service, a segment routing (SR) service; and a network programming service.

Optionally, in any of the preceding aspects, the header of the extension header(s) added by the router includes a field that specifies a total number of MPLS extension header(s) added to the packet, a field that specifies a total length of the MPLS extension header(s) included in the packet as modified, and a field that specifies a type of the next header included in the packet as modified.

Optionally, in any of the preceding aspects, each MPLS extension header of the one or more MPLS extension headers added by the router includes a field that specifies a type of the next header included in the packet as modified, and a field that specifies a length of the MPLS extension header. The type of the next header that is specified in the header of the extension header(s) and the type of the next header that is specified in each MPLS extension header can be any of the following, but are not limited thereto: a network service header (NSH) type, an in-situ operations, administration, maintenance (IOAM) type, a segment routing (SR) type, an Internet Protocol version 4 (IPv4) type, an Internet Protocol version 6 (IPv6) type, a none type, and an unknown type. Where a field that specifies the type of the next header includes a none indication, this indicates that there is no next header. Where a field that specifies the type of the next header includes an unknown indication, this indicates that the type of the next header is unknown.

Optionally, in any of the preceding aspects, an MPLS label stack, which can also be referred to as the MPLS header, includes a plurality of MPLS label stack entries. In accordance with certain embodiments, the indication within the MPLS label stack that one or more MPLS extension headers have been added to the packet comprises an extension header label (EHL) within a label value field within one of the plurality of MPLS label stack entries included in the MPLS label stack. More specifically, in certain embodiments, the EHL comprises one of sixteen special-purpose label values that are reserved by the MPLS working group of the Internet Engineering Task Force (IETF). In accordance with alternative embodiments, another one of the plurality of MPLS label stack entries included within the MPLS label stack includes a special-purpose label value of 15, which is reserved by the MPLS working group of the Internet Engineering Task Force (IETF) to indicate that an Extension Label is included in the MPLS label stack and enables the router to identify the EHL. In still other embodiments, a forward equivalent class (FEC) is used to indicate that one or more MPLS extension headers follow the MPLS label stack.

Optionally, in any of the preceding aspects, where the router that modifies the packet comprises a label edge router (LER), the packet modified by the LER comprises an original inner packet, and the LER adds the MPLS label stack to the original inner packet.

Optionally, in any of the preceding aspects, where the router that modifies the packet comprises a label switch router (LSR), the packet modified by the LSR comprises an MPLS packet that already includes the MPLS label stack or at least a portion thereof.

According to one other aspect of the present disclosure, a router for inclusion in a multiprotocol label switching (MPLS) network comprises a network interface, a memory storage comprising instructions, and one or more processors in communication with the memory and the network interface. The network interface is configured to receive and forward packets over the MPLS network. The one or more processors execute the instructions to modify a packet received via the network interface by adding one or more MPLS extension headers, adding a header of the extension header(s), and adding an indication within an MPLS label stack that one or more MPLS extension headers have been added to the packet. The one or more processors further execute the instructions to forward the packet as modified via the network interface to another router of the MPLS network.

Optionally, in any of the preceding aspects, the router can comprise a label edge router (LER), in which case the packet modified by the LER comprises an original inner packet, and the one or more processors of the LER adds the MPLS label stack to the original inner packet.

Optionally, in any of the preceding aspects, the router can comprise a label switch router (LSR), in which case the packet modified by the LSR comprises an MPLS packet that already includes the MPLS label stack or at least a portion thereof.

Optionally, in any of the preceding aspects, at least one of the one or more MPLS extension headers supports an in-network service that is not supported by the MPLS network, examples of which were provided above.

Optionally, in any of the preceding aspects, the header of the extension header(s), which is added by the router, includes a field that specifies a total number of MPLS extension headers added to the packet, a field that specifies a total length of the MPLS extension header(s) included in the packet as modified, and a field that specifies a type of the next header included in the packet as modified.

Optionally, in any of the preceding aspects, each MPLS extension header, of the one or more MPLS extension headers added by the router, includes a field that specifies a type of the next header included in the packet as modified, and a field that specifies a length of the MPLS extension header. Examples of the type of the next header that can be specified in the header of the extension header(s), and the type of the next header that can be specified in each MPLS extension header, were provided above.

Optionally, in any of the preceding aspects, each of the fields that specifies the type of the next header can include a none indication, which indicates that there is no next header, or an unknown indication, which indicates that the type of the next header is unknown.

Optionally, in any of the preceding aspects, an MPLS label stack, which can also be referred to as the MPLS header, includes a plurality of MPLS label stack entries. In accordance with certain embodiments, the indication within the MPLS label stack that one or more MPLS extension headers have been added to the packet comprises an extension header label (EHL) within a label value field within one of the plurality of MPLS label stack entries included in the MPLS label stack. More specifically, in certain embodiments, the EHL comprises one of sixteen special-purpose label values that are reserved by the MPLS working group of the Internet Engineering Task Force (IETF). In accordance with alternative embodiments, another one of the plurality of MPLS label stack entries included within the MPLS label stack includes a special-purpose label value of 15, which is reserved by the MPLS working group of the Internet Engineering Task Force (IETF) to indicate that an Extension Label is included in the MPLS label stack and enables the router to identify the EHL. In still other embodiments, a forward equivalent class (FEC) is used to indicate that one or more MPLS extension headers follow the MPLS label stack.

According to one other aspect of the present disclosure, a non-transitory computer-readable medium storing computer instructions is provided that when executed by one or more processors of a router of a multiprotocol label switching (MPLS) network cause the one or more processors of the router to perform the steps of: modifying a packet received by the router by adding one or more MPLS extension headers, adding a header of the extension header(s), adding an indication within an MPLS label stack that one or more MPLS extension headers have been added to the packet, and forwarding the packet as modified to another router of the MPLS network.

Optionally, in any of the preceding aspects, the header of the extension header(s) added to the packet received by the router includes a field that specifies a total number of MPLS extension header(s) added to the packet, a field that specifies a total length of the MPLS extension header(s) included in the packet as modified, and a field that specifies a type of the next header included in the packet as modified.

Optionally, in any of the preceding aspects, each MPLS extension header of the one or more MPLS extension headers added by the router includes a field that specifies a type of the next header included in the packet as modified, and a field that specifies a length of the MPLS extension header.

Embodiments of the present technology described herein provide improvements to existing MPLS networks what are widely deployed throughout the world, but currently have certain limitations that embodiments of the present technology can be used to overcome. More specifically, MPLS networks are not able to support multiple in-network services, such as, but not limited to, NSH, IOAM, SR, and network programming. For example, network programming can be supported by encoding some instructions into an extension header, which instructions tell the network node (i.e., router) to execute some specific functions. Embodiments of the present technology add one or more such capabilities to an MPLS network in an efficient manner by adding such capabilities without adding extensive overhead to MPLS packets.

According to one other aspect of the present disclosure, a method is provided for implementing one or more in-network services to a MPLS network. The method comprises a router of the MPLS network receiving a packet that includes one or more MPLS extension headers, a header of the extension header(s), and an indication within an MPLS label stack that one or more MPLS extension headers have been added to the packet. The method also comprises the router of the MPLS network, in response to determining that the one or more MPLS extension headers have been added to the packet, using a MPLS extension header of the one or more MPLS extension headers to perform an associated in-network service.

Optionally, in any of the preceding aspects, at least one of the one or more MPLS extension headers, which are added to the packet, support an in-network service that is not otherwise supported by the MPLS network. For example, in-network services that the method can add to an MPLS network include, but are not limited to: a network service header (NSH) service, an in-situ operations, administration, and maintenance (IOAM) service, a segment routing (SR) service, and a network programming service.

According to one other aspect of the present disclosure, a router for inclusion in an MPLS network includes a network interface, a memory storage comprising instructions, and one or more processors in communication with the memory and the network interface. The network interface is configured to receive and forward packets over the MPLS network. The one or more processors executes the instructions to determine, based on an MPLS label stack of a packet received by the router, whether one or more MPLS extension headers have been added to the packet. The one or more processors, in response to determining that the one or more MPLS extension headers have been added to the packet, further executes the instructions to perform one or more in-network services associated with the one or more MPLS extension headers.

Optionally, in any of the preceding aspects, at least one of the one or more MPLS extension headers, which are added to the packet, support an in-network service that is not supported by the MPLS network. For example, in-network services that the method can add to an MPLS network include, but are not limited to: a network service header (NSH) service, an in-situ operations, administration, and maintenance (IOAM) service, a segment routing (SR) service, and a network programming service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 6 and 7 are high level flow diagrams that are used to summarize methods according to certain embodiments of the present technology.

DETAILED DESCRIPTION

The present disclosure will now be described with reference to the figures, which in general relate to methods and devices (e.g., routers) that add one or more in-network services to an MPLS network. It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
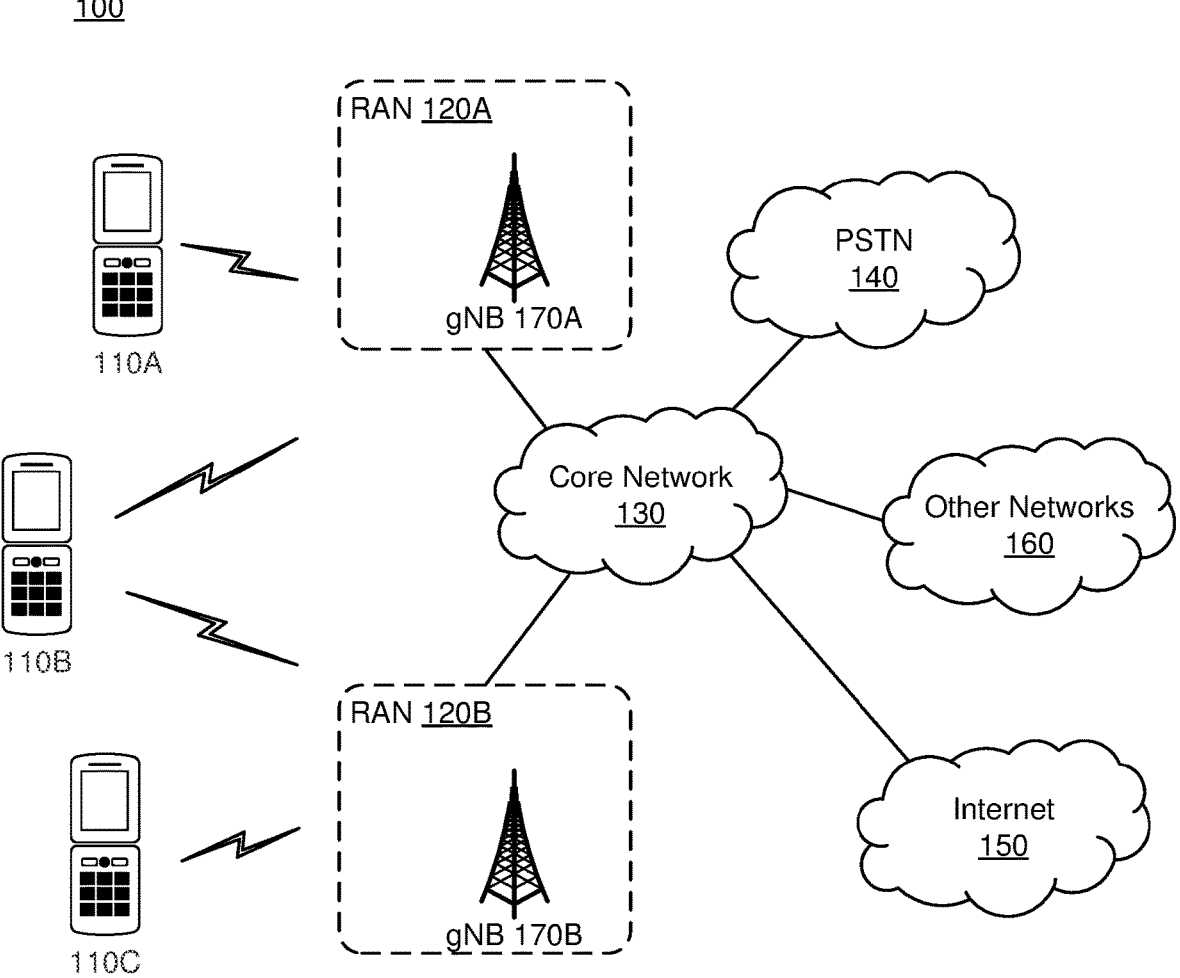
FIG. 1 illustrates an exemplary communication system for communicating data.

FIG. 1 illustrates an exemplary communication system 100 with which embodiments of the present technology can be used. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks, including corporate intranets. While certain numbers of these components or elements are shown in the figure, any number of these components or elements may be included in the system 100.

In one embodiment, the communication system 100 can include a wireless network, which may be a fifth generation (5G) network including at least one 5G base station which employs orthogonal frequency-division multiplexing (OFDM) and/or non-OFDM and a transmission time interval (TTI) shorter than 1 milliseconds (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as an UE 110, or collectively as the UEs 110, are configured to operate and/or communicate in the system 100. For example, an UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred to individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 170B forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMO) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipments, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDAs, iPads, Tablets, mobile terminals, smart phones, laptop embedded equipped (LEE), laptop mounted equipment (LME) and USB dongles.

One or more of the networks 130, 140, 150 and/or 160 (or portions thereof) can utilize Multiprotocol Label Switching (MPLS), which is a type of data-carrying technique for high-performance telecommunications networks. In other words, one or more of the networks 130, 140, 150 and/or 160 can be or can include an MPLS network.

MPLS directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, asynchronous transfer mode (ATM), Frame Relay (FR), and data subscriber line (DSL), just to name a few.

As noted above, MPLS was originally conceived to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc.) by the use of Pseudowire (PW) encapsulation techniques.

MPLS essentially enables faster routing decisions by preconfiguring "tags" which determine a path between one router and the next. The "tags" are essentially labels carried in short packet header fields which are extracted by switching/forwarding network nodes, known as label switched routers (LSRs). LSRs are preconfigured to associate certain labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS label stacking is already known in the art as a means of implementing MPLS tunneling. To implement MPLS tunneling, an outer transport label is used to establish a bulk transport Label Switched Path (LSP) (which functions as a tunnel), often between the provider edge devices of a provider's network, and within each bulk LSP inner transport labels are used to identify each traffic flow. Each packet can carry many label stack entries organized as a last-in-first-out stack. In normal forwarding across an MPLS network an LSR processes only the top (i.e., outermost) label. At any LSR, a labelled header can be added to the stack (by the LSR performing a "push" operation) or removed from the stack (by the LSR performing a "pop" operation). The label stacking allows the aggregation of LSPs into a single LSP for a portion of the route, which creates a "tunnel".

Figure 2:
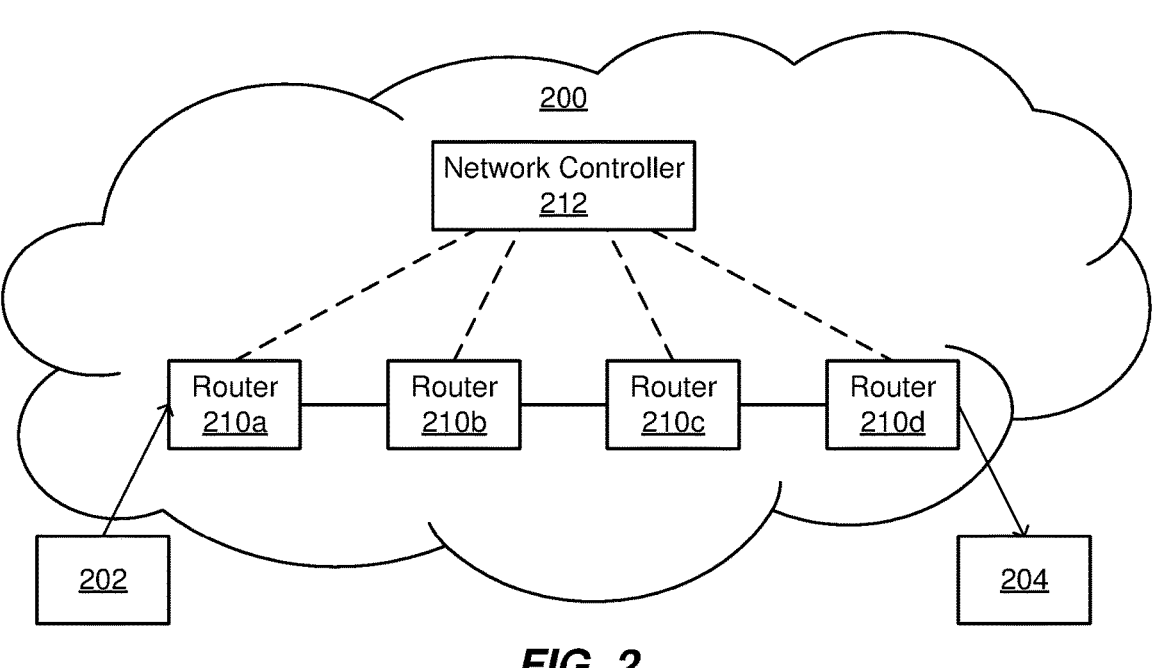
FIG. 2 illustrates an exemplary MPLS network, which may be or be included in one of the networks shown in FIG. 1.

FIG. 2 illustrates an exemplary MPLS network 200 that includes routers 210a, 210b, 210c, and 210d, each of which can be referred to as a router 210, or which can be collectively referred to as the routers 210. While only four routers 210 are shown in FIG. 2, an MPLS network would likely include significantly more than four routers 210. Each of the routers 210 can also be referred to more generally as a node of the MPLS network 200. FIG. 2 also shows how the MPLS network 200 can be used to transport one or more packets from a first device 202 to a second device 204, both of which are communicatively coupled to the MPLS network 200. FIG. 2 also illustrates a network controller 212 that is communicatively coupled to each of the routers 210 of the MPLS network 200, as represented in dashed lines. The network controller 212 can be used to perform a variety of control path and/or control plane functions. The control plane of an MPLS network (e.g., 200) is the part of the router architecture that is responsible for collecting and propagating the information that will be used later to forward incoming packets. Routing Protocols and label distribution protocols are parts of the control plane. The control plane is responsible for exchanging layer 3 routing information and labels. By contrast, a data plane of an MPLS network is responsible for forwarding packet based on labels and IP header. The data plane can have a simple forwarding engine that maintains a Label Forwarding Information Base (LFIB), which is a table a router uses to forward labelled packets through a network, and a Forwarding Information Base (FIB), which is a table that a router looks at when deciding where to forward traffic.

As noted above, the router 210 can also be referred to as a node of the MPLS network 200. When the MPLS network 200 is used to transfer one or more packets from the first device 202 to the second device 204, the router 210a can be more specifically referred to as an ingress router or ingress node, and the router 210d can be more specifically referred to as an egress router or egress node. Even more specifically, the ingress router 210a can be referred to as a Label Edge Router (LER), which is a router that first encapsulates a packet inside an MPLS Label Switched Path (LSP), wherein the MPLS LSP is essentially a unidirectional tunnel between a pair of routers of an MPLS network. The router 210d can be referred to more specifically as the egress router. The routers 210b and 210c can be referred to more specifically as label switch routers (LSRs) or transit nodes, which are routers that perform MPLS switching in the middle of an LSP. The router 210d, which as noted above can be referred to more as the egress node, is the final router at the end of the LSP.

When an unlabeled packet enters the ingress router (e.g., 210a in FIG. 2) and needs to be passed on to an MPLS tunnel, the router first determines the forwarding equivalence class (FEC) for the packet and then inserts one or more labels in the packet's newly created MPLS header, which can also be referred to as an MPLS label stack. The packet is then passed on to the next hop router for this tunnel. An MPLS header includes a stack of one or more MPLS label stack entries, and thus, an MPLS header can also be referred to as an MPLS label stack. The format of an MPLS label stack entry is discussed below with reference to FIG. 4A.

An MPLS header can be added between the network layer header (i.e., the layer 3 header) and the link layer header (i.e., the layer 2 header) of the Open Systems Interconnection model (OSI model). Because MPLS often operates at the layer that is generally considered to lie between the traditional definitions of OSI Layer 2 (data link layer) and Layer 3 (network layer), MPLS is often referred to as a layer 2.5 protocol. MPLS was designed to provide a unified data-carrying service for both circuit-based clients and packet-switching clients which provide a datagram service model. MPLS can be used to carry many different kinds of traffic, including IP packets, as well as native ATM, SONET, and Ethernet frames. Is it also possible that an MPLS header can be added between other layers of the OSI model, besides between layers 3 and 2.

When a labeled packet is received by an MPLS router (e.g., 210b or 210c in FIG. 2), the topmost label is examined. Based on the contents of the label a swap, push (impose), or pop (dispose) operation is performed on the packet's MPLS label stack. As will be described in additional detail below with reference to FIG. 4B, an MPLS label stack includes a plurality of MPLS label stack entries. Routers (e.g., 210 in FIG. 2) can have prebuilt lookup tables that tell them which kind of operation to perform, based on the topmost label of the incoming packet so they can process the packet very quickly. In a swap operation the label is swapped with a new label, and the packet is forwarded along the path associated with the new label. In a push operation a new label is pushed on top of the existing label, effectively "encapsulating" the packet in another layer of MPLS. This allows hierarchical routing of MPLS packets. Notably, this is used by MPLS virtual private networks (VPNs). In a pop operation, the label is removed from the packet, which may reveal an inner label below. This process is called "decapsulation". If the popped label was the last on the label stack, the packet "leaves" the MPLS tunnel. This can be done by the egress router (e.g., 210d in FIG. 2).

During the above described operations, the contents of the packet below the MPLS Label stack are not examined. Indeed, transit routers (also referred to as LSRs) typically need only to examine the topmost label on the stack. The forwarding of the packet is done based on the contents of the labels, which allows "protocol-independent packet forwarding" that does not need to look at a protocol-dependent routing table and avoids the expensive IP longest prefix match at each hop.

At the egress router (e.g., 210d in FIG. 2), when the last label has been popped, only the payload remains. This can be an IP packet, or any of a number of other kinds of payload packet. The egress router must therefore have routing information for the packet's payload, since it must forward it without the help of label lookup tables. An MPLS transit router (e.g., 210b and 210c in FIG. 2) has no such requirement.

Usually (by default with only one label in the stack, accordingly to the MPLS specification), the last label is popped off at the penultimate hop (the hop before the egress router). This is called penultimate hop popping (PHP). By using PHP, transit routers connected directly to this egress router effectively offload it, by popping the last label themselves. In the label distribution protocols, this PHP label pop action is advertised as reserved or special-purpose label value 3 "implicit-null" (which is never found in a label, since it means that the label is to be popped).

Figure 3:
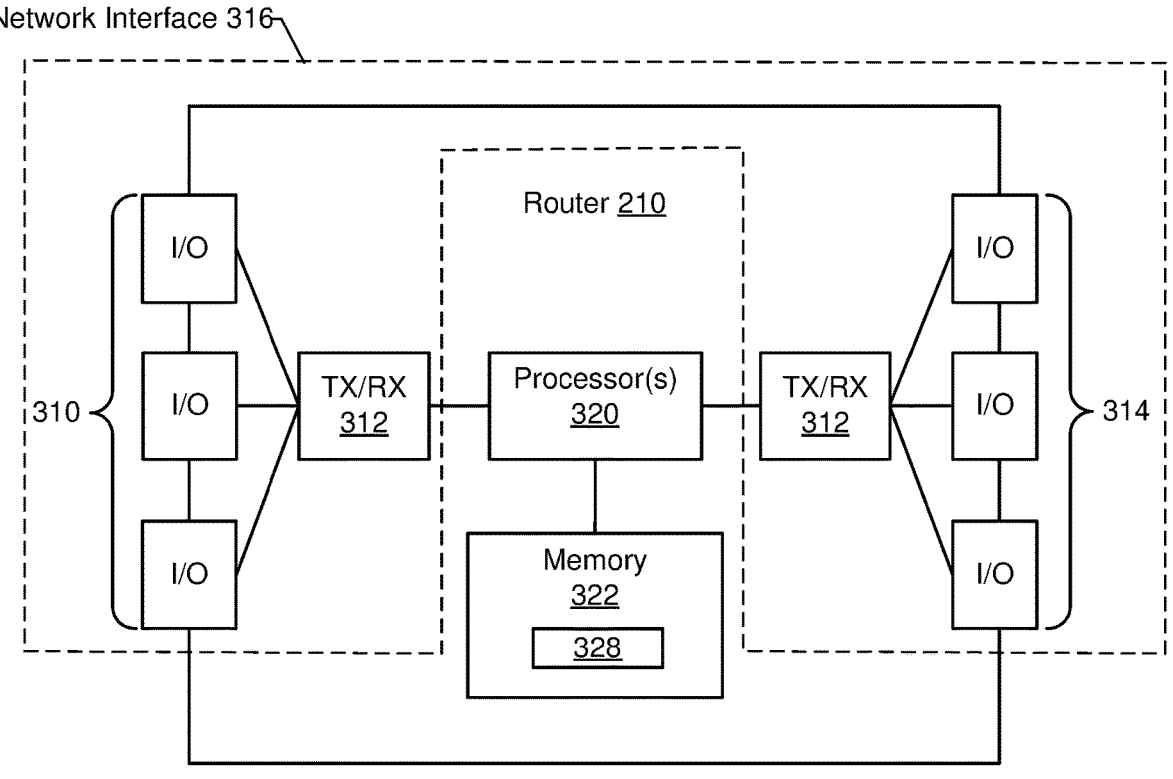
FIG. 3 is a schematic diagram illustrating exemplary details of a router of an MPLS network, such as the MPLS network shown in FIG. 2.

FIG. 3 is a schematic diagram illustrating exemplary details of a router 210, or more generally a network node, according to an embodiment. The router or network node 210 can be configured to implement or support embodiments of the present technology disclosed herein. The router 210 may comprise downstream ports 310, transceivers (TX/RX) 312, memory 322, one or more processor(s) 320, and upstream ports 314. The ports 310 and 314 and the transceivers 312 can be collectively referred to as a network interface 316 that is configured to receive and transmit packets over an MPLS network.

The memory 322 may include a data packet modifying and forwarding block 328 that may be implemented on the processor(s) 320. The data packet modifying and forwarding block 328 may be used to implement embodiments of the present technology described herein, including, but not limited to, the methods summarized with reference to FIG. 6. Alternatively, the data packet modifying and forwarding block 328 may be implemented directly on at least one of the processor(s) 320. The data modifying and packet forwarding block 328 may be used to modify data packets and route data packets using routing information within the data packets. More specifically, the processor(s) 320 can be configured to implement embodiments of the present technology described below. In accordance with certain embodiments, the memory 322 stores computer readable instructions that are executed by the processor(s) 320 to implement embodiments of the present technology. It would also be possible for embodiments of the present technology described below to be implemented, at least partially, using hardware logic components, such as, but not limited to, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc.

Figure 4A:
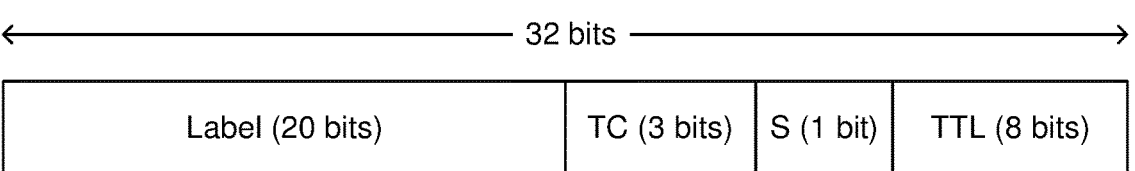
FIG. 4A shows the format of an MPLS label stack entry.

FIG. 4A shows the format of an MPLS label stack entry, which can also be referred to more succinctly as a label stack entry. The MPLS label stack entry is 32 bits in length (i.e., four octets) and comprises several functional fields. An MPLS label stack, which can also be referred to as an MPLS header, comprises a sequence of MPLS label stack entries. An exemplary position of the MPLS label stack in a frame (or equivalently in a packet) is shown in FIG. 4B.

As shown in FIG. 4A, a conventional 32 bit MPLS label stack entry comprises a 20 bit Label field, a 3 bit Traffic Class (TC) field, a 1 bit Bottom of Stack (S) field, and an 8 bit Time-To-Live (TTL) field. The 20 bit Label field of each label stack entry includes a label value. The MPLS Label field has an address space of 2^20 labels, i.e., 1,048,576 labels. However, as will be discussed in additional detail below, label values 0-15 are reserved by the IETF and cannot be used for dynamic label binding. The TTL field, which indicates the time to live of the MPLS packet, is used to prevent infinite forwarding loops of MPLS packets. The S field is the bottom of stack (BoS) field, which is also known as the bottom of stack flag, indicates where the MPLS label stack entry is in an MPLS header. When S=1 (i.e., when the bottom of stack flag is set), this indicates the MPLS label stack entry is at the bottom (i.e., innermost position which is closest to the payload) position in an MPLS header. When S=0 (i.e., when the bottom of stack flag is not set), this indicates the MPLS label stack entry is not at the bottom position in an MPLS header, and thus, there is at least one further label stack entry below. In other words, when S=1 in an MPLS label stack entry, this indicates that the MPLS label stack entry is at the bottom of the MPLS label stack. The 3-bit TC field can be used, e.g., to specify Quality of Service (QoS) priority and/or provide an Explicit Congestion Notification (ECN). Prior to 2009 the TC field was called the experiment (EXP) field.

Figure 4B:
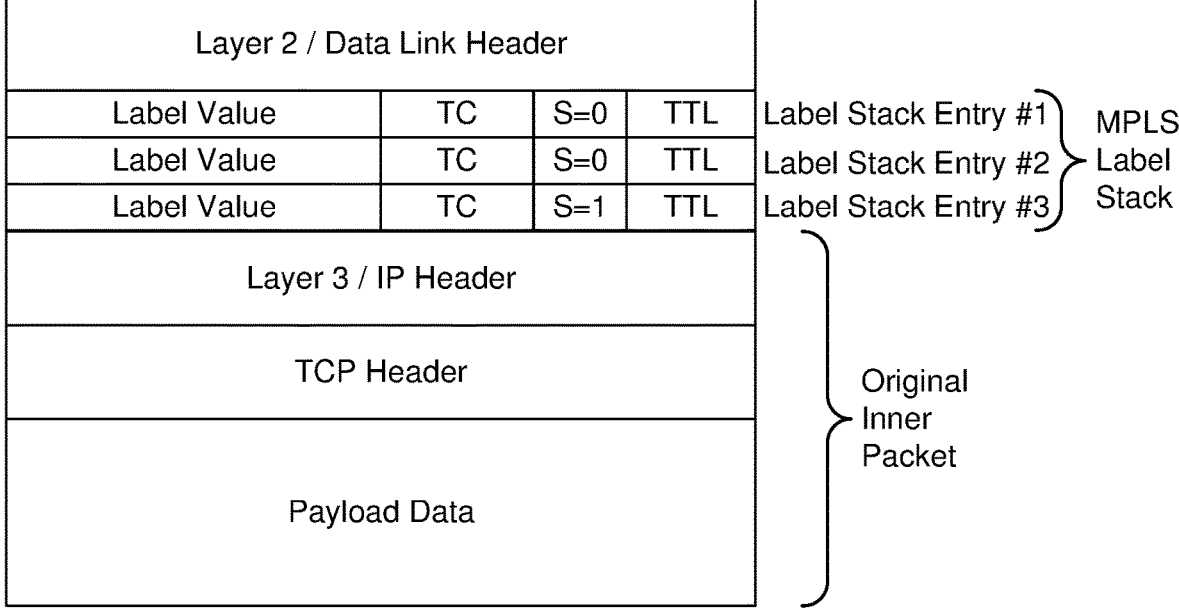
FIG. 4B shows the how the MPLS label stack entries can be positioned between a layer 2 (i.e., the data link layer) header and a layer 3 (i.e., the network layer) header.

FIG. 4B shows the how MPLS label stack entries can be positioned between a layer 2 (i.e., the data link layer) header and a layer 3 (i.e., the network layer) header. The layer 2 header can be, e.g., an Ethernet header that includes, destination and source Media Access Control (MAC) addresses (each six octets in length), an EtherType field (which is two octets long), and, optionally, an IEEE 802.1Q tag or IEEE 802.1ad tag. The layer 3 header can be, e.g., an Internet Protocol version 4 (IPv4) header, which is 256 bits long, or an Internet Protocol version 6 (Ipv6) header, which is 288 bits long, but is not limited thereto. Additionally, or alternatively, other headers may be added, for example, there could also be a Pseudowire (PW) Control Word header if the payload data is not Internet Protocol (IP). FIG. 4B provides just one example of how MPLS label stack entries can be positioned within a datagram. For example, it would also be possible for a layer 2 packet header (instead of a layer 3 packet header) to be below the MPLS label stack.

In the example shown in FIG. 4B, the MPLS label stack (i.e., the MPLS header) is shown as including three MPLS label stack entries, label stack entry #1, label stack entry #2, and label stack entry #3, each of which can also be referred to as a stack entry, with the label stack entry #3 being the bottom of the stack entry. Notice that in each of the label stack entry #1 and the label stack entry #2, S=0, meaning these label stack entries are not the bottom of the stack. Also notice that in the label stack entry #3, S=1, meaning this label stack entry is the bottom of the stack entry.

The MPLS working group of the Internet Engineering Task Force (IETF) is responsible for standardizing MPLS related technologies. The theoretical number of MPLS label values which could be provided by the 20 bit label value field of the MPLS header is 2^20, as noted above. However, in practice, the MPLS working group has reserved some label values for use as special-purpose labels. More specifically, 16 label values of the 2^20 possible label values have been reserved for special-purpose labels. So far, only 8 of the 16 reserved special-purpose label values have been allocated (which can also be referred to as assigned) by the MPLS working group, meaning an additional 8 reserved special-purpose label values are still unallocated (which can also be referred to as unassigned or still available). More specifically, the special-purpose label values 0-3, 7, and 13-15 have already been allocated, and the special-purpose label values 4-6, and 8-12 are still unallocated. Table 1, shown below, lists the special-purpose MPLS label values that have already been assigned, as well as those that are still unassigned.

TABLE 1

| Value | Description |
|---|---|
| 0 | Ipv4 Explicit NULL Label |
| 1 | Router Alert Label |
| 2 | Ipv6 Explicit NULL Label |
| 3 | Implicit NULL Label |
| 4-6 | Unassigned |
| 7 | Entropy Label Indicator (ELI) |
| 8-12 | Unassigned |
| 13 | GAL Label |
| 14 | OAM Alert Label |
| 15 | Extension Label |

Referring again to FIG. 2, as well as to FIG. 4B, when a labelled packet is received by an LSR (e.g., 210b or 210c in FIG. 2), the label value at the top of the MPLS label stack (i.e., closest to the layer 2 header in FIG. 4B) is first processed to look up forwarding information. This allows the receiving LSR to learn the port to which the packet can be forwarded and/or any operation(s) to be performed on the MPLS stack before forwarding. Examples of operations an LSR performs on an MPLS stack include replacing the top label stack entry with another value, popping an entry off the label stack, replacing the top label stack entry, or pushing one or more additional entries onto the MPLS label stack, as was discussed above. Other operations an LSR can perform include learning the outgoing data link encapsulation and any other information needed to properly forward the packet.

Depending on the label value assigned to the MPLS label field and other fields in an MPLS label stack entry, the label field can be interpreted in several ways by a receiving LSR. The label field can function, for example, as a forwarding label, as a source label, or as a functional label to indicate an operation that the LSR must perform.

When used as a forwarding label the label value field of the MPLS label stack entry functions as a proxy identifier for the "address" of the LSP destination end-point. In the case where this MPLS label stack entry is at the top of a stack of LSP MPLS headers, S=0. If it is, however, the sole MPLS label stack entry in the stack, then S=1. When used as a forwarding label, the label value field of the MPLS label stack entry is used to forward the MPLS traffic unit in the data plane towards the destination on a hop-by-hop basis, except when penultimate-hop-popping (PHP) is used, in which case the forwarding header is removed completely on the last hop.

When used as a source label, the 20 bit label value field functions as a proxy identifier for the "address" of the LSP source end-point. This functional use of a labelled header means it will invariably be the last entry in a stack of MPLS label stack entries and so the S bit will be set to 1. When used as a functional label, the label value field identifies a specific action that needs to be taken when received at an LSR. As is known in the art, the reserved values for the label field of the MPLS header specify specific functions which an LSR is to perform on a received packet. For example, label 14 indicates a router Operation and Maintenance (OAM) alert to pass the contents of the traffic unit to the control/management plane for further action. In such a labelled header the S bit will usually be set to 1 (but this may not always be the case with other functional uses).

While MPLS has provided many benefits over prior networking protocols, as well as over some newer network protocols, it would be beneficial if MPLS could support multiple in-network services. In other words, a technical problem with MPLS is that it was not designed to support in-network services, such as, but not limited to, Network Service Header (NSH), In-situ Operations, Administration, and Maintenance (IOAM), Segment Routing (SR), and network programming. In-network services, as the term is used herein, refers to functions, applications, or services applied by network devices (e.g., routers) on user traffic. Such in-networks services are usually performed by adding some header to the user packets, with the header encoding the necessary information for the service. The header is usually removed before the user packet is delivered to the destination so that it is agnostic to end users. Embodiments of the present technology, as will be described in additional detail below, can be used to add one or more in-network services to an MPLS network that does not otherwise support such in-network service(s). However, before describing such embodiments, it is first useful to briefly describe some of the in-network services that can be added to an MPLS network using embodiments of the present technology.

Network Service Header (NSH) contains service path information and optionally metadata that are added to a packet or frame and used to create a service plane, i.e., to realize service function paths. An outer transport header is imposed, on NSH and the original packet/frame, for network forwarding. A Service Classifier adds NSH. NSH is removed by the last Service Function Forwarder (SFF) in the service chain or by a Service Function (SF) that consumes the packet. Service functions are widely deployed and essential in many networks. These service functions provide a range of features such as security (e.g., by adding firewalls), Wide Area Network (WAN) acceleration, and server load balancing. Service functions may be instantiated at different points in the network infrastructure such as the wide area network, data center, campus, and so forth. NSH defines a service plane protocol specifically for the creation of dynamic service chains and is composed of the following elements: Service Function Path identification; indication of location within a Service Function Path; and optional per packet metadata (fixed length or variable). NSH is composed of a 4-byte Base Header, a 4-byte Service Path Header and optional Context Headers. The NSH standard and updates thereto are made available on the IETF's website https://datatrackenietf.org/doc/. Prior to the embodiments described herein, there was not believed to be any way of adding NSH services to an MPLS network.

In-situ Operations, Administration, and Maintenance (IOAM) records operational information and telemetry information in a packet while the packet traverses a path between two points in a network. The term "in-situ" refers to the fact that the OAM data is added to the data packets rather than being sent within packets specifically dedicated to OAM. "In-situ" mechanisms do not require extra packets to be sent and hence don't change the packet traffic mix within the network. IOAM mechanisms can be leveraged where network mechanisms being used to transport packets do not apply or do not offer the desired results, such as proving that a certain traffic flow takes a pre-defined path, Service Level Agreement (SLA) verification for the live data traffic, detailed statistics on traffic distribution paths in networks that distribute traffic across multiple paths, or scenarios in which probe traffic is potentially handled differently from regular data traffic by the network devices. The IOAM standard and updates thereto are made available on the IETF's website https://datatrackenietf.org/doc/. Prior to the embodiments described herein, there was not believed to be any way to add multiple in-network services to an MPLS network, such as adding both NSH and IOAM services. Network programming can be supported by encoding some instructions into an MPLS extension header, which instructions tell a router to execute some specific functions.

The current MPLS standard does not support multiple in-network services, but rather, can at best support only a single network service. Further, in order to support a single network service, the current MPLS standard requires full label stack scanning, which can adversely affect network performance. Additionally, the current MPLS standard already has some overloaded label semantics, meaning certain labels, such as the Generic Associated Channel Label (GAL), are already being used for multiple purposes.

Embodiments of the present technology, described herein, can be used to overcome the above noted technical problem with MPLS, namely that it was not designed to support in-network services. More specifically, embodiments of the present technology described herein can be used to enable an MPLS network to support multiple in-network services, such as, but not limited to, Network Service Header (NSH), In-situ Operations, Administration, and Maintenance (IOAM), Segment Routing (SR), and network programming. Beneficially, embodiments of the present technology can enable multiple in-network services to be stacked together. Further, embodiments of the present technology provide for backwards compatibility, if needed, e.g., for legacy routers that have not yet been updated to specifically function in accordance with the technology described herein. Further, certain embodiments of the present technology can be used to avoid or minimize the need for deep label stack scanning, which if not avoided can degrade performance by increasing latency. More specifically, certain embodiments of the present technology described herein are related to MPLS Extension Headers that provide for generic, scalable, high performance and future proof solutions to the above noted technical problems with MPLS.

Certain embodiments of the present technology are related to MPLS Extension Headers (which can also be referred to herein more succinctly as Extension Headers), and related metadata. An example of such embodiments is initially described with reference to FIG. 5, which illustrates an exemplary datagram 500 (or portion thereof) that includes Extension Headers and related metadata. Beneficially, embodiments of the present technology enable different types of Extension Headers to be stacked one above the other in a manner that enables multiple in-network services to be added to an MPLS network.

Figure 5:
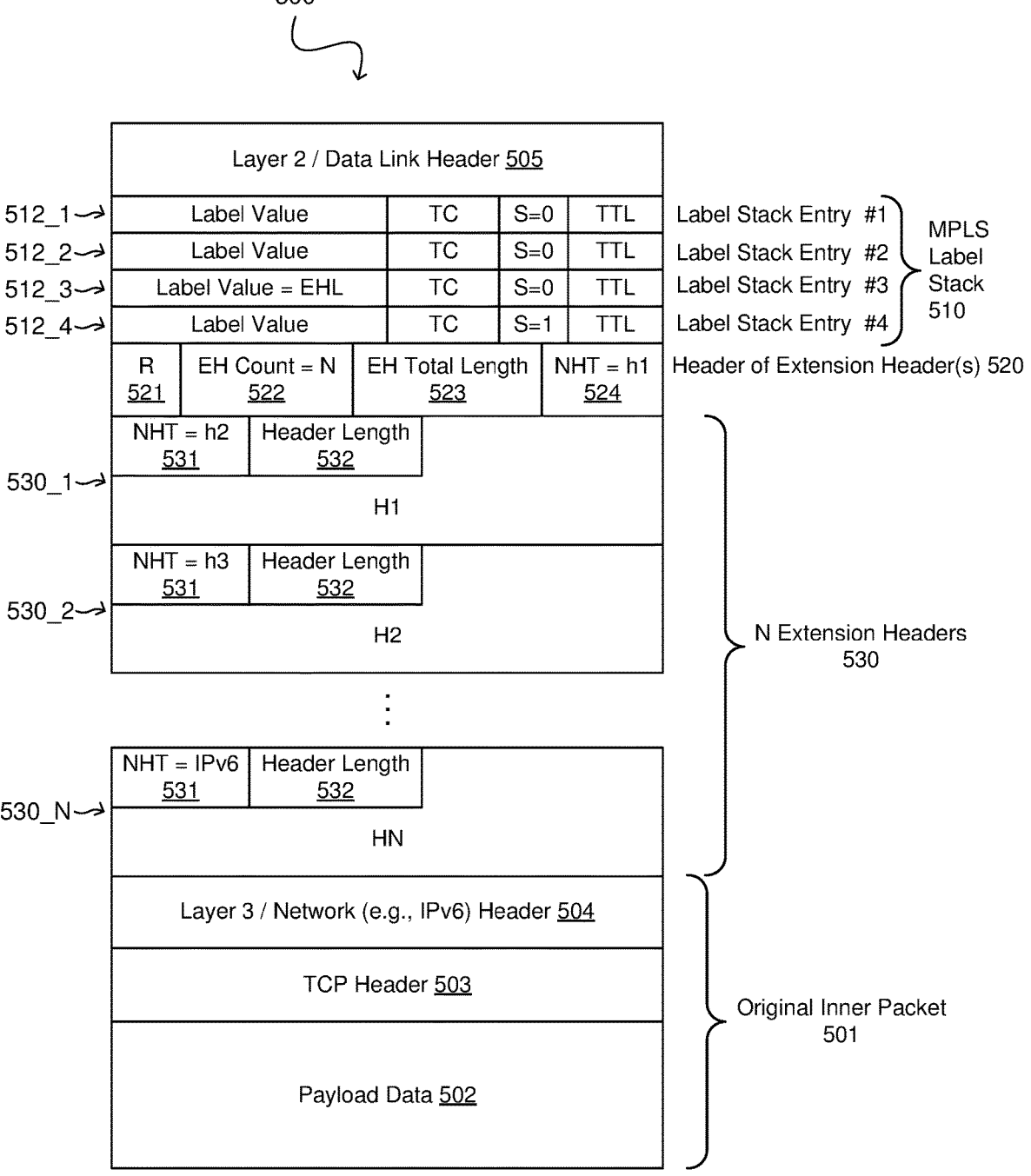
FIG. 5 shows an exemplary datagram that can be produced by a router that implements certain embodiments of the present technology.

Referring to FIG. 5, the datagram 500 is shown as including an original data packet 501, which in this example is shown as including payload data 502, a Transmission Control Protocol (TCP) header 503, and a layer 3 (i.e., network layer) header 504, which can be, e.g., an IPv4 or IPv6 header, but is not limited thereto. This is just one example of an original data packet 501, which is not intended to be limiting. The original data packet 501 can also be referred to as the original inner packet 501, as shown in FIG. 5. The datagram 500 is also shown as including an MPLS label stack 510 (which can also be referred to as an MPLS header 510), a Header of Extension Headers (HEH) 520, and a plurality (i.e., N) Extension Headers 530. The datagram 500 is also shown as including a layer 2 (i.e., data link layer) header 505.

The MPLS label stack 510 in this example is shown as including four MPLS label stack entries 512_1, 512_2, 512_3, and 512_4, which are also labeled respectively label stack entries #1, #2, #3, and #4. The MPLS label stack entries 512_1, 512_2, 512_3, and 512_4 can be referred individually as a label stack entry 512. The MPLS label stack entries 512_1, 512_2, 512_3, and 512_4 can be referred to collectively as label stack entries 512, an MPLS label stack 510, or as an MPLS header 510. The label stack entries 512 are each shown as including a "Label Value" in their respective 20 bit label value field. Each "Label Value" in the 20 bit label value field of an MPLS label stack entry 512 can be a forwarding label (i.e., an address) of the next router (e.g., 210) in a Label Switched Path (LSP). It is also possible that one or more Label Value in the 20 bit label value field of an MPLS label stack entry 512 is one of the 8 special-purpose label values shown in Table 1 above, e.g., a GAL label.

The MPLS label stack entry 512_3 is shown as including an Extension Header Label (EHL) in its 20 bit label value field. In accordance with certain embodiments of the present technology, the EHL is assigned one of the 8 currently unallocated reserved special-purpose label values (i.e., is assigned one of the currently unassigned special-purpose label values 4, 5, 6, 8, 9, 10, 11, or 12). Whether the EHL will be assigned one of the 8 currently unallocated reserved special-purpose label values, and which specific one of the 8 currently unallocated reserved special-purpose label values is assigned to the EHL, will be up to the MPLS working group of the IETF. The inventors of the present technology believe that the use of MPLS Extension Headers, as described herein, is a significant enough use case to deserve one of the currently unassigned special-purpose label values.

In accordance with certain embodiments, the EHL is used to indicate that one or more Extension Headers 530 follow (i.e., are below) the MPLS Label Stack 510. In the embodiment shown, a Header of the Extension Header(s) (HEH) 520 is included between the MPLS Label Stack 510 (which can also be referred to as the MPLS Header 510) and the N Extension Header(s) 530, where N is an integer that is equal to or greater than 1.

Depending upon the specific MPLS implementation, as well as whether all the routers in a specific MPLS network have been updated to correctly identify and utilize the EHL, the EHL can be included in: the 20 bit label value field of the label stack entry 512 that is at the top of the MPLS Label Stack 510 (i.e., in the label stack entry #1, 512_1 in FIG. 5); the 20 bit label value field of the label stack entry 512 that is at the bottom of the MPLS Label Stack 510 (i.e., in the label stack entry #4, 512_4 in FIG. 5); or in the 20 bit label value field of one of the middle the label stack entries 512 in the MPLS Label Stack 510 (i.e., in the label stack entry #2 or #3, 512_2 or 512_3, in FIG. 5). In other words, the EHL can be included in any location in the MPLS Label Stack 510.

In the example shown in FIG. 5, the Extension Header Label (EHL) is included in the 20 bit label value field of one of the middle label stack entries 512 in the MPLS Label Stack 510, and more specifically, is included in the label stack entry #3, 512_3. Whenever the EHL is not included in the label stack entry at the top of the MPLS Label Stack 510, a router would need to scan the MPLS Label Stack 510 in order to determine that the EHL is included within the MPLS Label Stack 510.

If the EHL is included in the 20 bit label value field of the label stack entry 512 that is at the very top of the MPLS Label Stack 510 (i.e., if included in the 20 bit label value field of the label stack entry #1, 512_1), then the EHL can be quickly identified by a router (e.g., 210) that receives a datagram (e.g., 500) that includes the EHL and MPLS Extension Headers. However, in order for the EHL of a label stack entry 512 to be placed at the top of the MPLS Label Stack 510, then all routers within an MPLS network that may transport such a datagram would need to be updated to be able to interpret and use MPLS Extension Headers 530. Otherwise a router that has not been updated to identify the EHL and use MPLS Extension Headers would likely drop the datagram including the EHL and MPEL Extension Headers, and the original inner packet 501 may never make it to its intended destination.

In general, the EHL can be included in any location in the MPLS Label Stack 510, as noted above. However, in order for the use of the EHL to be backwards compatible with legacy routers that have not yet been updated to identify the EHL, the EHL should be located at the bottom of the MPLS Label Stack 510. For upgraded networks in which all routers have been updated to identify the EHL and use Extension Headers, the EHL can be included at any location in the stack. However, for performance reasons it would typically be better to locate the EHL at or close to the top of the MPLS Label Stack 510, in order to reduce or minimize how much scanning down of the MPLS Label Stack 510 is needed to be performed by a router.

The Header of the Extension Header(s) (HEH) 520 is shown as including four header fields, including a Reserved (R) field 521, an Extension Header Count (EH Count) field 522, an EH Total Length field 523, and a Next Header Type (NHT) field 524. The Next Header Type (NHT) field 524 can also be referred to more succinctly as the Next Header (NH) field 524. Although a specific order of the fields 521, 522, 523, and 524 of the HEH 520 is shown in FIG. 5, this is just an exemplary order which can be rearranged, and thus, the order of the fields 521, 522, 523, and 524 is not limited to the order shown in FIG. 5. The HEH 520 can also be referred to as the Extension Header(s) Header (EHH) 520, since it essential a header for the Extension Header(s) 530. Where a datagram includes a sequence of MPLS Extension Headers 530, as is the case in FIG. 5, the sequence can be referred to as an MPLS Extension Header list.

The Reserved (R) field 521 of the HEH 520 includes one or more bits (e.g., 4 to 6 bits) that are reserved for future use, and in certain embodiments can be eliminated. The EH Count field 522 includes a plurality of bits (e.g., 8 bits) that are used to specify the total number of Extension Headers 530 that follow the HEH 520. The EH Total Length field 523 includes a plurality of bits (e.g., 8 or 16 bits) that are used to specify total length of the Extension Headers 530. The value included within the EH Total Length field enables a router or other device to jump directly to the original inner packet 501 that follows the N Extension Headers 530 if desired. The Next Header Type (NHT) field 524 includes a plurality of bits (e.g., 8 bits) that are used to indicate the type of header that is included in the next Extension Header 530 or other next header. Exemplary types that may be specified by the NHT field 524 include, IOAM, NSH, and SR, but are not limited thereto. The NHT field 524 enables a router or other device to know how to interpret and use the next Extension Header 530 or other type of header within the datagram 500. The total length of the Header of the Extension Header(s) 520 can be the same length as each label stack entry 512 (i.e., 32 bits), or shorter or longer than the length of each label stack entry 512 (i.e., less than or greater than 32 bits). Accordingly, it should be appreciated that the widths of the various label stack entries, headers and other fields represented in FIG. 5 (as well as other FIGS.) are not drawn to scale.

In accordance with certain embodiments, values included in the EH Count field 522 are zero-based numbering values, such that a value of 0 means that there is 1 Extension Header 530 that follow the Header of the Extension Header(s) 520, a value of 1 means that there are 2 Extension Headers 530 that follow the Header of the Extension Header(s) 520, and more generally a value of M means that there are M+1 Extension Headers 530 that follow the Header of the Extension Header(s) 520. Similarly, the value included in the EH Total Length field 523 can also be a zero-based numbering value. In alternative embodiments, the values included the EH Count field 522 and/or the EH Total Length field 523 need not be zero-based numbering values.

Still referring to FIG. 5, each Extension Header 530 includes a Next Header Type (NHT) field 531, which is similar to the NHT field 524 included in the Header of the Extension Header(s) 520, in that it indicates the type of the next header. The next header can be an Extension Header 530, or some other type of header, such as a header (e.g., a network layer header 504) within the original inner packet 501. As noted above, exemplary types of next headers that can be specified by the NHT field 531 includes Network Service Header (NSH), In-situ Operations, Administration, and Maintenance (IOAM), Segment Routing (SR), and network programming, but are not limited thereto. Other exemplary next header types that can be specified by the NHT field 531 include IPv4, IPv6, none, and unknown, but are not limited thereto.

Each Extension Header 530 also includes a Header Length field 532, which specifies the length of the individual Extension Header. The Header Length field 532 enables a router to jump to the next header included in a datagram, if desired. Each NHT field 531 can be 8 bits, or some other number of bits, depending upon implementation. Each Header Length field 532 can be 8 bits, or some other number of bits, depending upon implementation. In FIG. 5, in each Extension Header 530 the NHT field 531 is shown as being located before the Header Length field 532, but this order can be reversed. It would also be possible for each Extension Header 530 to include one or more additional fields. The data fields and associated formats of the remaining portion of each respective Extension Header 530 is dependent upon the type of header thereof. For example, if the type of the Extension Header 530_1 is IOAM, then the data fields and associated format of the remaining portion of the Extension Header 530_1 may be in accordance with the standard for IOAM specified by the IETF. For another example, if the type of the Extension Header 530_2 is NSH, then the data fields and associated format of the remaining portion of the Extension Header 530_1 may be in accordance with the standard for NSH specified by the IETF.

In accordance with certain embodiments, the NHT field can have two special values, including a NONE value, and an UNKOWN value. The NONE value means that there is no header and no payload following the header (i.e., there is no original inner packet 501 following the Extension Header 530) that includes the NHT field having the NONE value. The UNKNOWN value means that the type of header in the next header or payload is unknown. The special UNKOWN value provides for compatibility with the original MPLS protocol design.

As shown above in Table 1, one of the MPLS label values that is reserved as a special-purpose label value is the value 15, which is reserved as the "Extension Label". The "Extension Label", also referred to as the "XL" or "XL(15)", is set aside for the purpose of extending the space of special-purpose labels. In accordance with certain embodiments, rather than using one of the 8 currently unallocated special-purpose reserved label values (i.e., one of the unassigned special-purpose values 4-6 and 8-12) within the label field of an MPLS label stack entry 512 to indicate that Extension Headers follow the MPLS Label Stack 510, the "Extension Label" can instead be used. In other words, a two-label scheme that includes XL(15) plus an Extension Header Label (EHL), can be used to indicate that one or more Extension Headers follow the MPLS Label Stack 510. Accordingly, such embodiments can be referred to as the XL(15)+EHL embodiments, or as the two-label scheme. For example, referring to FIG. 5, in order to implement an XL(15)+EHL embodiment, the EHL in the label field of the MPLS Header #3, 512_3 could be replaced with the special-purpose label value 15, and the label value in the label field of the MPLS Header #4, 512_4 should include the Extension Header Label (EHL). An additional MPLS Header would need to be added to the MPLS Label Stack 510, in FIG. 5, if three forwarding type addresses are to be specified by the MPLS Label Stack 510.

One advantage of using the two-label scheme just described above is that it does not require that one of the 8 remaining unallocated special-purpose MPLS label values 4-6 and 8-12 be allocated by the IETF. Thus, the two-label scheme would help preserve the scarce resources of the special-purpose MPLS label values, which are limited to a total of 16. However, the two-label scheme, because it requires two labels in the MPLS Label Stack (rather than one label in the MPLS Label Stack) to indicate that Extension Header(s) follow the MPLS Label Stack, would increase the size of the MPLS Label Stack by 32 bits compared to the scenario where the EHL was assigned to one of the 8 remaining unallocated special-purpose values 4-6 and 8-12. In other words, when using the two-label scheme, in order for the same information to be included within the MPLS Label Stack shown in FIG. 5, one additional label stack entry 512 (e.g., a label stack entry #5, 512_5, not shown in FIG. 5) would need to be added.

In still other embodiments, Forward Equivalent Class (FEC) is used to indicate whether MPLS Extension Header(s) follow the MPLS Label Stack. Forwarding Equivalence Class (FEC) is a term used in MPLS to describe a set of packets with similar or identical characteristics which may be forwarded the same way, i.e., they may be bound to the same MPLS label. More specifically, an FEC is a set of packets that a single router forwards to the same next hop, out the same interface (e.g., the same upstream port), with the same treatment (such as queuing). When using FEC to indicate the existence of Extension Header(s), for each forwarding next hop within an MPLS network, one of two potential label values (corresponding to the same next hop) is assigned by a router and included in the label value field of a label stack entry. The two label options (e.g., labels A and B) would have the same forwarding behavior, but only one of the two labels would specify that there is/are one or more Extension Header(s) in this MPLS data packet or datagram that should be processed. In other words, if there is no Extension Header in the packet or datagram being forwarded by the router, then a first one of the two label values (e.g., label A) is included in a label stack entry; and if there is/are one or more Extension Headers in the packet or datagram being forwarded (as added by the router, or by some other router), then a second one of the two label values (e.g., label B) is included in the label stack entry. The next hop router that receives that packet could then determine whether or not there is/are Extension Header(s) in the packet it receives based on whether the first or second label value (label value A or B) is included in the label value filed of a label stack entry.

Assume for example that a label value A means "forward to router x" and label value B means "forwarding to router x and process Extension Header(s)". A router that is not capable of processing Extension Header(s) can still receive a packet with label value B. But in that case, the control plane would configure that router to make value B just mean "forward to x", so that the packet can be correctly forwarded. If a router is capable of processing Extension Headers, then the control plane will configure that router to make value B mean "forward to x and process Extension Header(s)", so the router, when seeing label value B, will do the proper processing of Extension Header(s).

The two labels in such embodiments are an FEC. Such embodiments would avoid the need for one of the 8 remaining unallocated special-purpose MPLS label values 4-6 and 8-12 to be allocated. However, the embodiments that use FEC would likely increase the complexity of the control plane of the MPLS network, e.g., because router tables would need to include two potential label values for each potential next hop in the MPLS network. Additionally, the embodiments that use FEC would limit the application potentials of the MPLS Extension Headers, e.g., because use of the FEC option would make it more difficult to add Segment Routing to an MPLS network.

Routers (e.g., 210) within an MPLS network can add an MPLS Label Stack (e.g., 510) to an original inner packet (e.g., 501). Routers (e.g., 210) can also perform a push operation to add an MPLS header to the MPLS Label Stack, a pop operation to remove an MPLS header from the MPLS Label Stack, or a swap operation to swap a label within an MPLS header with a new label. The same routers (e.g., 210) can also be used to add MPLS Extension Header(s) 530 and a Header of Extension Header(s) (HEH) 520 to an original inner packet 501, as well as to modify an MPLS Label Stack 510 (i.e., the MPLS header 510) to indicate the presence of MPLS Extension Header(s) 530 within the MPLS packet or datagram.

For example, referring briefly back to FIG. 1, a Label Edge Router (LER) (e.g., 210a) or a Label Switch Router (LSR) (e.g., 210b, 210c) can add one or more Extension Header(s) (e.g., 530) to a packet. An LER (e.g., 210a) could add the Extension Header Label (EHL) within an MPLS Label Stack (e.g., 510), add a Header of the Extension Header(s) (HEH) (e.g., 520), as well as add the one or more Extension Header(s) (e.g., 530) to the original inner packet (e.g., 501), when producing an MPLS packet. An LSR (e.g., 210b, or 210c) could add the Extension Header Label (EHL) within an MPLS Label Stack (e.g., 510), add a Header of the Extension Header(s) (HEH) (e.g., 520), as well as add one or more Extension Header(s) (e.g., 530) to an MPLS packet, e.g., to the MPLS packet produced by an LER (e.g., 210a). If an MPLS network is a software-defined network (SDN), the aforementioned actions can be initiated from a network controller (e.g., 212). However, it is noted that the MPLS network that implements MPLS Extension Headers in accordance with the embodiments described herein need not be an SDN.

Embodiments of the present technology described herein provide improvements to existing MPLS networks what are widely deployed throughout the world, but currently have certain limitations that embodiments of the present technology can be used to overcome. More specifically, MPLS networks are not able to support multiple in-network services, such as, but not limited to, NSH, IOAM, SR, and network programming. Further, embodiments of the present technology add such capabilities to MPLS networks in an efficient manner by adding such capabilities without adding extensive overhead to MPLS packets.

The high level flow diagrams of FIGS. 6 and 7 will now be used to summarize methods according to certain embodiments of the present technology. Such methods can be used to add one or more in-network services to a multiprotocol label switching (MPLS) network.

Referring to FIG. 6, step 602 involves a router of the MPLS network receiving a packet. Step 604 involves the router of the MPLS network modifying the packet by adding one or more MPLS extension headers, adding a header of the extension header(s), and adding an indication within an MPLS label stack that one or more MPLS extension headers have been added to the packet. An exemplary packet or datagram resulting from the modifications performed at step

604 is shown in and discussed above with reference to FIG. 5. Step 606 involves the router of the MPLS network forwarding the packet as modified to another router of the MPLS network. One of the routers 210, discussed above with reference to FIGS. 2 and 3, can be used to perform steps 602, 604, and 606.

At least one of the one or more MPLS extension headers, which is/are added to a packet at step 604, can support an in-network service that is not otherwise supported by the MPLS network. For example, in-network services that the method can add to an MPLS network include, but are not limited to: network service header (NSH), in-situ operations, administration, and maintenance (IOAM), segment routing (SR), and network programming.

One or more MPLS Extension Headers can be added or removed anywhere in an MPLS network, i.e., by various different routers (e.g., 210 in FIG. 2) within the MPLS network. If an MPLS Extension Header to be added to a packet is the first MPLS Extension Header being added to the packet, then an Extension Header Label (EHL), the Header of the Extension Header(s) (HEH), and the MPLS Extension Header needs to be added to the packet. If an MPLS Extension Header to be added is not the first MPLS Extension Header added to a packet (i.e., if at least one MPLS Extension Header has already been added to a packet and is still added to the packet), then the MPLS Extension Header just needs to be chained in an MPLS Extension Header list (e.g., 530 in FIG. 5). If an MPLS Extension Header to be removed is the only (or last remaining) MPLS Extension Header, then the Extension Header Label (EHL), the Header of the Extension Header(s) (HEH), and the MPLS Extension Header all need to be removed from the packet. If an MPLS Extension Header to be removed is not the last MPLS Extension Header, then the MPLS Extension Header just needs to be removed from the MPLS Extension Header list while the EHL, HEH, and the other MPLS Extension Header(s) remain.

In accordance with certain embodiments, such as those described above with reference to FIG. 5, the HEH, which is added by a router, includes a field that specifies a total number of MPLS extension headers added to the packet, a field that specifies a total length of the MPLS extension header(s) included in the packet as modified, and a field that specifies a type of the next header included in the packet as modified, as noted above. As also described above with reference to FIG. 5, each MPLS extension header, of the one or more MPLS extension headers added by the router, includes a field that specifies a type of the next header included in the packet as modified, and a field that specifies a length of the MPLS extension header. The type of the next header that is specified in the header of the extension header(s), and the type of the next header that is specified in each MPLS extension header, can be any of the following, but are not limited thereto: network service header (NSH), in-situ operations, administration, and maintenance (IOAM), segment routing (SR), Internet Protocol version 4 (IPv4), Internet Protocol version 6 (IPv6), none, and unknown. Where a field that specifies the type of the next header includes a none indication, this indicates that there is no next header. Where a field that specifies the type of the next header includes an unknown indication, this indicates that the type of the next header is unknown.

An MPLS label stack (e.g., 510 in FIG. 5), which can also be referred to as the MPLS header, includes a plurality of MPLS label stack entries. In accordance with certain embodiments, the indication within the MPLS label stack, that one or more MPLS extension headers have been added to the packet, comprises an extension header label (EHL) within a label value field within one of the plurality of MPLS label stack entries included in the MPLS label stack. More specifically, in certain embodiments, the EHL comprises one of sixteen special-purpose label values that are reserved by the MPLS working group of the Internet Engineering Task Force (IETF). In accordance with alternative embodiments, another one of the plurality of MPLS label stack entries included within the MPLS label stack includes a special-purpose label value of 15, which is reserved the MPLS working group of the Internet Engineering Task Force (IETF) to indicate that an Extension Label is included in the MPLS label stack, and thereby enables the router to identify the EHL. In still other embodiments, a forward equivalent class (FEC) is used to indicate that one or more MPLS extension headers follow the MPLS label stack.

Where the router that modifies the packet (at step 604) comprises a label edge router (LER), e.g., 210*a* in FIG. 2, the packet that is modified by the LER comprises an original inner packet, and the LER adds the MPLS label stack to the original inner packet.

Where the router that modifies the packet comprises a label switch router (LSR), e.g., 210*b* or 210*c* in FIG. 2., the packet that is modified by the LSR comprises an MPLS packet that already includes the MPLS label stack or at least a portion thereof.

Referring now to FIG. 7, step 702 involves a router of the MPLS network receiving a packet that already includes one or more MPLS extension headers, a header of the extension header(s), and an indication within an MPLS label stack that one or more MPLS extension headers have been added to the packet. Still referring to FIG. 7, step 704 involves the router of the MPLS network, in response to determining that one or more MPLS extension headers have been added to the packet, using at least one of the one or more MPLS extension headers to perform one or more in-network services associated with the at least one of the one or more MPLS extension headers. The router can determine that one or more MPLS extension headers have been added to the packet by detecting the EHL at the top of the MPLS Label Stack, or scanning the MPLS Label Stack, as was explained above in more detail. Other variations are possible, as explained above, such as the use of an FEC. At least one of the MPLS extension headers can support an in-network service that is not otherwise supported by the MPLS network, such as, network service header (NSH), in-situ operations, administration, and maintenance (IOAM), segment routing (SR), and/or network programming.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for modifying a packet to enable multiple network services to be implemented by a multiprotocol label switching (MPLS) network, the method comprising:

a network device of the MPLS network receiving a packet;

the network device of the MPLS network modifying the packet by adding multiple MPLS extension headers, wherein each of the multiple MPLS extension headers added to the packet is used to implement a different one of the multiple network services for the MPLS network including at least one of Network Service Header (NSH), In-situ Operations, Administration, and Maintenance (IOAM), and network programming service; and the network device of the MPLS network forwarding the packet as modified to another network device of the MPLS network.

2. The method of claim 1, wherein the multiple network services include one or more of the following:

a segment routing (SR) service; or an extension header label (EHL) which comprises one of sixteen special-purpose reserved label values.

3. The method of claim 1, wherein the multiple network services include two or more of the following:

the NSH service;

the IOAM service;

an SR service; or a network programming service.

4. The method of claim 1, further comprising:

the network device adding an indication within an MPLS label stack of the packet that one or more MPLS extension headers have been added to the packet.

5. The method of claim 4, wherein:

the MPLS label stack includes a plurality of MPLS label stack entries; and the indication within the MPLS label stack that one or more MPLS extension headers have been added to the packet comprises an extension header label (EHL) within a label value field within one of the plurality of MPLS label stack entries included in the MPLS label stack.

6. The method of claim 5, wherein the EHL comprises one of sixteen special-purpose label values that are reserved by the MPLS working group of the Internet Engineering Task Force (IETF).

7. The method of claim 5, wherein another one of the plurality of MPLS label stack entries included within the MPLS label stack includes a special-purpose label value of 15, which is reserved by the MPLS working group of the Internet Engineering Task Force (IETF) to indicate that an Extension Label is included in the MPLS label stack and enables the network device to identify the EHL.

8. The method of claim 1, further comprising:

the network device adding a header of the extension headers;

wherein the header of the extension headers added by the network device includes an extension header count (EH Count) field that specifies a total number of the multiple MPLS extension headers included in the packet as modified.

9. The method of claim 8, wherein the header of the extension headers added by the network device also includes a total length field that specifies a total length of the multiple MPLS extension headers included in the packet as modified.

10. The method of claim 1, wherein each MPLS extension header of the multiple MPLS extension headers added by the network device includes a field that specifies a type of the next header included in the packet as modified, and a field that specifies a length of the MPLS extension header.

11. A network device comprising:

a network interface configured to receive and forward packets over a multiprotocol label switching (MPLS) network;

a memory comprising instructions; and one or more processors in communication with the memory and with the network interface, wherein the one or more processors execute the instructions to:

modify a packet received via the network interface by adding multiple MPLS extension headers, wherein each of the multiple MPLS extension headers added to the packet implements a different one of multiple network services for the MPLS network including at least one of Network Service Header (NSH), In-situ Operations, Administration, and Maintenance (IOAM), and network programming service; and forward the packet as modified to another network device of the MPLS network.

12. The network device of claim 11, wherein the multiple network services include one or more of the following:

a segment routing (SR) service; or an extension header label (EHL) which comprises one of sixteen special-purpose reserved label values.

13. The network device of claim 11, wherein the multiple network services include two or more of the following:

the NSH service;

the IOAM service;

an SR service; or a network programming service.

14. The network device of claim 11, wherein the one or more processors execute the instructions to also add an indication within an MPLS label stack of the packet that one or more MPLS extension headers have been added to the packet.

15. The network device of claim 14, wherein:

the MPLS label stack includes a plurality of MPLS label stack entries; and the indication within the MPLS label stack that one or more MPLS extension headers have been added to the packet comprises an extension header label (EHL) within a label value field within one of the plurality of MPLS label stack entries included in the MPLS label stack.

16. The network device of claim 15, wherein the EHL comprises one of sixteen special-purpose label values that are reserved by the MPLS working group of the Internet Engineering Task Force (IETF).

17. The network device of claim 15, wherein another one of the plurality of MPLS label stack entries included within the MPLS label stack includes a special-purpose label value of 15, which is reserved by the MPLS working group of the Internet Engineering Task Force (IETF) to indicate that an Extension Label is included in the MPLS label stack and enables the network device to identify the EHL.

18. The network device of claim 11, wherein:

the one or more processors execute the instructions to also add a header of the extension headers; and wherein the header of the extension headers includes an extension header count (EH Count) field that specifies a total number of the multiple MPLS extension included in the packet as modified.

19. The network device of claim 18, wherein the header of the extension headers also includes a total length field that specifies a total length of the multiple MPLS extension headers included in the packet as modified.

20. The network device of claim 11, wherein each MPLS extension header of the multiple MPLS extension headers includes a field that specifies a type of the next header included in the packet as modified, and a field that specifies a length of the MPLS extension header.

21. A non-transitory computer-readable medium storing computer instructions that when executed by one or more processors of a network device of a multiprotocol label switching (MPLS) network cause the network device to perform the steps of:

modifying a packet received by the network device by adding multiple MPLS extension headers, wherein each of the multiple MPLS extension headers added to the packet is used to implement a different one of multiple network services for the MPLS network including at least one of Network Service Header (NSH), In-situ Operations, Administration, and Maintenance (IOAM), and network programming service; and forwarding the packet as modified to another network device of the MPLS network.

22. The non-transitory computer-readable medium of claim 21, wherein the multiple network services include one or more of the following:

a segment routing (SR) service; or an extension header label (EHL) which comprises one of sixteen special-purpose reserved label values.

23. The non-transitory computer-readable medium of claim 21, wherein the instructions also cause the network device to perform the step of:

adding an indication within an MPLS label stack of the packet that one or more MPLS extension headers have been added to the packet.

24. The non-transitory computer-readable medium of claim 23, wherein:

the MPLS label stack includes a plurality of MPLS label stack entries; and the indication within the MPLS label stack that one or more MPLS extension headers have been added to the packet comprises an extension header label (EHL) within a label value field within one of the plurality of MPLS label stack entries included in the MPLS label stack.

25. The non-transitory computer-readable medium of claim 24, wherein the EHL comprises one of sixteen special-purpose label values that are reserved by the MPLS working group of the Internet Engineering Task Force (IETF).

26. The non-transitory computer-readable medium of claim 24, wherein another one of the plurality of MPLS label stack entries included within the MPLS label stack includes a special-purpose label value of 15, which is reserved by the MPLS working group of the Internet Engineering Task Force (IETF) to indicate that an Extension Label is included in the MPLS label stack and enables the network device to identify the EHL.

* * * * *